(12) United States Patent
Wilson et al.

(10) Patent No.: US 8,361,260 B2
(45) Date of Patent: Jan. 29, 2013

(54) AUTOMOBILES HAVING A RADIANT BARRIER

(76) Inventors: Stephen S. Wilson, Las Vegas, NV (US); Bart Wilson, Las Vegas, NV (US); Seth Wilson, Las Vegas, NV (US)

(*) Notice: Subject to any disclaimer, the term of this patent is extended or adjusted under 35 U.S.C. 154(b) by 867 days.

(21) Appl. No.: 12/502,944

(22) Filed: Jul. 14, 2009

(65) Prior Publication Data
US 2011/0013272 A1      Jan. 20, 2011

(51) Int. Cl.
*B29C 65/00* (2006.01)

(52) U.S. Cl. .......... 156/71; 156/247; 359/359; 359/360; 428/41.7

(58) Field of Classification Search .......... None
See application file for complete search history.

(56) References Cited

U.S. PATENT DOCUMENTS

| | | | |
|---|---|---|---|
| 5,000,528 A * | 3/1991 | Kawakatsu | 359/585 |
| 5,183,700 A | 2/1993 | Austin | |
| 5,239,406 A * | 8/1993 | Lynam | 359/275 |
| 5,318,685 A * | 6/1994 | O'Shaughnessy | 204/192.27 |
| 5,510,173 A * | 4/1996 | Pass et al. | 428/216 |
| 6,049,419 A | 4/2000 | Wheatley et al. | |
| 7,101,810 B2 * | 9/2006 | Bond et al. | 438/758 |
| 7,215,473 B2 | 5/2007 | Fleming | |
| 2006/0057399 A1 | 3/2006 | Persoone et al. | |
| 2008/0118678 A1 | 5/2008 | Huang et al. | |
| 2008/0160321 A1 | 7/2008 | Padiyath et al. | |
| 2008/0231979 A1 | 9/2008 | Chen | |
| 2008/0286500 A1 * | 11/2008 | Sussner et al. | 428/13 |
| 2008/0292820 A1 | 11/2008 | Padiyath et al. | |
| 2009/0011205 A1 * | 1/2009 | Thiel | 428/215 |

FOREIGN PATENT DOCUMENTS

| | | |
|---|---|---|
| JP | 6-143496 | 5/1994 |
| JP | 7-21456 | 1/1995 |

OTHER PUBLICATIONS

Dupont Teijin Films; Mylar Polyester Film—Product Properties; 2 pages.
WWW.WIKIPEDIA.ORG; Black Body; Jul. 6, 2009; 11 pages.
WWW.WIKIPEDIA.ORG; Infrared; Jul. 6, 2009; 12 pages.
WWW.WIKIPEDIA.ORG; PET Film (biaxially oriented); 4 pages.

* cited by examiner

*Primary Examiner* — Mark A Osele
*Assistant Examiner* — Nickolas Harm
(74) *Attorney, Agent, or Firm* — Stetina Brunda Garred & Brucker

(57) ABSTRACT

An automobile or vehicle having a high efficiency solar control system is provided. The automobile may have a painted surface and a film mounted to its exterior side. The film may reflect solar radiation in the near and mid infrared ranges yet allow high transmission of light in the visible range such that the painted panel may be seen. The film may have a layer of silver which reflects the solar radiation in the near and mid infrared ranges. Since the silver is susceptible to oxidation and turns the silver into a black body which absorbs the near and mid infrared radiation, the film may be designed to slow the rate of oxidation of the silver layer to an acceptable level. The silver layer may be sandwiched between the glass which does not allow oxygen to diffuse there through and reach the layer of silver and a stack of sacrificial layers having a certain thickness which slows down the rate of oxygen diffusion to an acceptable level.

5 Claims, 4 Drawing Sheets

AUTOMOBILES HAVING A RADIANT BARRIER

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to an automobile having a film mounted to its painted surface for reducing solar radiation load yet allowing the paint's color to shine through the film.

Direct sunlight on a painted surface of an automobile or vehicle may cause drivers to use the air conditioning system and/or use the air conditioning system at a higher level. The reason is that the paint and the underlying panel (e.g., metallic panel) may behave as a black body absorbing infrared radiation and re-radiating the absorbed infrared radiation as heat into the automobile cabin. Unfortunately, as a result, the air conditioning system may consume a large percentage of energy expended by the automobile in light of its overall energy consumption. By way of example and not limitation, the air conditioning system of the automobile may consume approximately twenty percent (20%) to about sixty percent (60%) of the total amount of energy consumed by the automobile. As such, reducing the cooling needs may reduce total energy consumption by the automobile.

The California Air Resources Board ("CARB") has been attempting to draft a "cool car standard" for vehicles which would come into effect sometime in the future. The standard would require that the paint of any newly produced car to have a solar reflectivity of greater than a certain level (e.g., 65%). Unfortunately, such cool car standard has been postponed since it is believed that the requirements cannot be met by paint manufacturers. Also, even if the standard could be met, eighty (80) % compliance is believed to take approximately fourteen (14) years to implement.

Several factors determine the comfort level within the cabin of the automobile. They include the cabin air temperature, air speed within the automobile cabin, humidity of the air within the automobile cabin and the amount of thermal radiation entering the automobile cabin. When the cabin air temperature is uncomfortably hot, the automobile occupants may turn on the air conditioning system to cool down the average air temperature. In this instance, the air conditioning unit consumes energy to reduce the air temperature of the automobile cabin. The automobile occupants may also turn on and/or increase fan speed to increase air speed of the air circulating within the automobile cabin. The fan consumes energy. The speed of air within the automobile cabin increases evaporation of moisture on the skin of the automobile occupants which cools the occupant's skin temperature.

While driving during the day, the automobile cabin is exposed to the solar radiation. A portion of the solar radiation is absorbed by the paint and heated. A portion of the solar radiation may be transmitted through the paint and absorbed by the metallic panel under the paint. The infrared radiation absorbed by the paint and the metallic panel heats up and re-radiates energy into the cabin of the automobile to thereby increase the average air temperature of the automobile cabin. Additionally, the re-radiated energy may be absorbed by the interior of the automobile cabin. As such, the interior of the automobile cabin may have a large amount of re-radiated infrared radiation being transmitted. Unfortunately, since the roof, interior and windows of the automobile cabin tend not to allow transmission of infrared radiation there through, the automobile cabin retains the infrared radiation and may have an air temperature greater than ambient air temperature.

Moreover, the re-radiated radiation may be transmitted through the air within the automobile cabin and be directly absorbed by the occupant's skin. This may cause the occupants to feel uncomfortably hot thereby encouraging use of the air conditioning system of the automobile even if the cabin air temperature is within a comfortable range. This may cause the occupant to turn on the air conditioning system and/or fan. Use of the air conditioning system and the fan both consume energy. Any reduction in the use of the air conditioning system and fan would also reduce the total amount of energy consumed by the automobile.

The human skin contains receptors that are sensitive to thermal radiation in the infrared range. When the automobile occupants are exposed to the re-radiated thermal radiation, the occupants may be uncomfortable even if the cabin air temperature is within a comfortable range. The occupants may resort to decreasing the average air temperature of the cabin and increasing the air speed of the fan system to counteract the discomfort caused by the reradiated thermal radiation, both of which consume increasing amounts of energy.

As such, there is a need in the art for an apparatus and method for reducing the need to use the air conditioning system and/or fan of the automobile and mitigating exposure to thermal radiation.

BRIEF SUMMARY

The present invention addresses the needs discussed above, discussed below and those that are known in the art.

A vehicle is provided having a high efficiency solar control system. The solar control system may comprise a metallic panel which is coated with paint. A film may be mounted to the exterior side of the paint, namely, the side closer to the environment. The metallic panel of the vehicle may be any portion of the vehicle such as the roof, hood, trunk, door or any other surface area upon which the sun's rays are exposed. The film may have high transmission of light in the visible range such that the color of the paint may be transmitted or seen through the film. Also, the film may reflect a high percentage of light in the near infrared range and the mid infrared range back into the environment. As such, the solar load on the automobile is reduced by the amount of solar radiation in the near infrared range and the mid infrared range reflected back into the environment. Preferably, the film is mounted to the roof of the vehicle such that the solar load on the cabin of the automobile is reduced by the amount of reflected infrared radiation.

The film may additionally have a plurality of sacrificial layers which have a high transmission value with respect to the visible range and the near and mid infrared ranges. The topmost sacrificial layer may be removed or peeled away when it has been unacceptably degraded due to environmental elements (e.g., chips, oxidation, etc.) thereby exposing a fresh new topmost layer. Additionally, the additional sacrificial layers mitigate oxidation of a silver layer embedded within the film. In particular, the film may be mounted to a painted surface of the vehicle. As such, one side of the film does not allow diffusion of oxygen into the film since oxygen cannot diffuse through the painted surface and underlying metallic panel. On the other side of the film (or the silver layer(s)), a thick stack of sacrificial layers may be formed. Although oxygen may be diffused through the sacrificial layers, such diffusion of oxygen through the sacrificial layers may be slowed down by increasing the thickness of the sacrificial layers. Either or both the number of sacrificial layers may be increased or decreased as appropriate or the thickness of each of the sacrificial layers may be increased or decreased to bring the rate of oxygen diffusion to an acceptable level. The silver layer is disposed between the glass and the thick stack of sacrificial layers which protects the silver layer from oxidation.

More particularly, an automobile comprising a metallic panel, paint layer and film is disclosed. The metallic panel may define an exterior side. The paint layer may be disposed on the exterior side of the metallic panel. The paint layer may define an exterior side. The film may be attached to the exterior side of the paint layer for reflecting infrared radiation away from the metallic panel.

The film may comprise an infrared reflecting layer defining an interior side and an exterior side. The interior side of the infrared reflecting layer may be attached to the exterior side of the paint layer. The infrared reflecting layer may have an embedded infrared reflecting core which comprises one or more layers of silver and one or more layers of dielectric for reflecting infrared radiation. The silver layer and dielectric layer may alternate. The film may further comprise one or more protective layers removeably attached to the exterior side of the infrared reflecting layer for mitigating oxidation of the silver layer and for providing a sacrificial top layer which can be removed when the top layer is damaged due to UV exposure or oxidation. The protective layers may be peelably adhered to one another. An exterior side of each of the protective layers may have an ultraviolet light absorbing hard coat.

The film may be a plurality of film pieces which are attached to the exterior side of the paint layer. As an aggregate, the plurality of film pieces may cover a portion of the automobile. At least one of the plurality of film pieces may have a straight elongate configuration, triangular configuration, rectangular configuration, circular configuration or semi-circular configuration. When the film is attached to the paint layer, the plurality of film pieces may be butted up against each other edge to edge. An adhesive layer disposed between the infrared reflecting layer and the paint layer for adhering the film to the paint layer.

The infrared reflecting layer may be generally transparent to visible spectrum of light. The infrared reflecting layer may be fabricated from biaxially-oriented polyethelene terephthalate.

The adhesive may be an ultraviolet light absorbing adhesive.

A method for reducing solar radiation load within an automobile is also disclosed. The method may comprise the steps of providing a film for reflecting infrared radiation wherein the film comprises an infrared reflecting layer and one or more protective layers. The infrared reflecting layer may define an interior side and an exterior side. The infrared reflecting layer may have an embedded infrared reflecting core which comprises one or more layers of silver and one or more layers of dielectric for reflecting infrared radiation. The one or more protective layers may be removeably attached to the exterior side of the infrared reflecting layer for mitigating oxidation of the silver layer and for providing a sacrificial top layer which can be removed when the top layer is damaged due to UV exposure or oxidation. The method may further comprise the step of attaching an interior side of the infrared reflecting layer to an exterior side of the automobile.

The attaching step may comprise the step of adhering the interior side of the infrared reflecting layer to the exterior side of the automobile. Also, the exterior side of the automobile may be at least one of a roof, hood, and trunk.

The method may further comprise the step of providing a stack of sacrificial layers removeably attached to each other such that a top most sacrificial layer may be removed and discarded when the top most protective layer is damaged due to ultraviolet exposure and/or oxidation.

In the providing the film step, the same may comprise the step of providing a plurality of film pieces. Also, in the attaching step, the same may comprise the step of butting up film pieces against each other edge to edge.

An automobile is also disclosed comprising a metallic panel defining an exterior side, a paint layer disposed on the exterior side of the metallic panel wherein the paint layer defines an exterior side, and a film attached to the exterior side of the paint layer for reflecting infrared radiation away from the metallic panel.

The film may comprise an infrared reflecting core which comprises one or more layers of silver and one or more layers of dielectric for reflecting infrared radiation, the infrared reflecting core defining opposed first and second sides, a first protective layers attached to the first side of the infrared reflecting layer wherein the first protective layer has a first thickness, a second protective layer attached to the second side of the infrared reflecting layer and the paint layer wherein the second protective layer has a second thickness and the first thickness is greater than the second thickness, and wherein the first and second protective layers provide structural support to the one or more silver layers and the thicker first protective layer mitigates oxidation of the one or more silver layers caused by oxygen diffusion through the first protective layer.

The automobile may further comprise a stack of sacrificial layers removeably attached to each other such that a top most sacrificial layer may be removed and discarded when the top most protective layer is damaged due to ultraviolet light exposure and/or oxidation. The sacrificial layers may be removeably adhered (e.g., peelably adhered) to each other.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
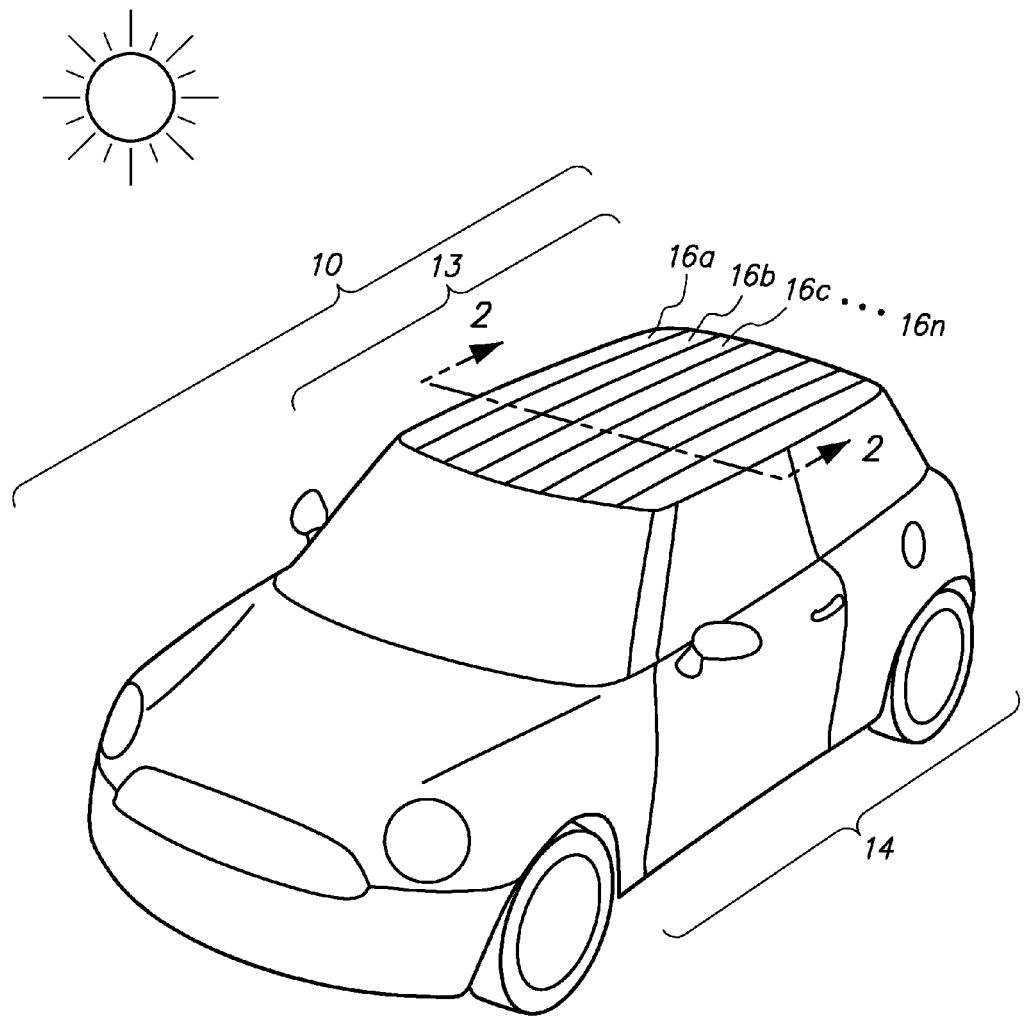
FIG. 1 illustrates an automobile having a high efficiency solar control system mounted to a roof of the vehicle.

Referring now to FIG. 1, an automobile 10 having a roof 15 is shown. The roof 15 protects the occupants from environmental elements (e.g., wind, rain, sun, etc.). As shown in FIG.

2, the roof 15 may have a film 16 (or a plurality of film pieces) attached to an exterior side 18 of a painted layer 21 of the roof 13. The film 16 may be generally optically transparent in the visible wavelengths and generally reflect radiation in the non-visible or infrared wavelengths. The sun's rays transmit solar radiation both in the visible light range and also in the infrared range. A majority of the radiation in the infrared range may be reflected back to the exterior 11 of the cabin 14 by the film 16. A small portion of the energy may be absorbed by the paint layer 21 and the underlying panel 23 of the roof 13, converted into heat and re-radiated into the interior 13 of the cabin 14. Beneficially, the film 16 reduces the amount of solar radiation in the near and mid infrared ranges from being absorbed by the paint layer 21 and the underlying panel 23 which is converted into heat and re-radiated into the interior 13 of the cabin 14. Rather, the film 16 reflects a significant amount of solar radiation in the near and mid infrared ranges back to the environment. As such, the amount of solar radiation load on the cabin 14 and thermal radiation re-radiated and contacting the occupant's skin are reduced. This lowers the average air temperature within the cabin 14. This also reduces discomfort of the occupants due to exposure to re-radiated infrared radiation. Beneficially, the film 16 increases the automobile occupant's comfort with respect to temperature.

Figure 2:
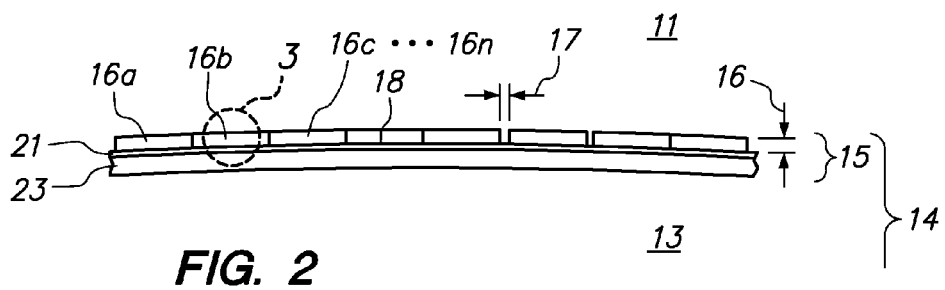
FIG. 2 is a cross-sectional view of the roof of the vehicle shown in FIG. 1.

Referring now to FIGS. 1 and 2, the film 16 may be provided in elongate rectangular pieces 16a, b, c-n. The pieces 16a-n may be approximately one inch to four inches wide and extend from edge to edge of the automobile. These pieces 16a-n may individually be adhered to a portion of the body of the vehicle 10. In FIGS. 1 and 2, that portion is the roof of the vehicle 10. Each of the pieces 16a, b, c-n may be butted up against each other, as shown in FIG. 2. Even if the edges of the pieces 16a-n do not perfectly butt up against each other and there are gaps 17, the film 16 is still effective to reduce the solar infrared radiation load on the cabin 14 of the vehicle 10 since the amount of solar infrared radiation being reflected is a function of surface area. The surface area of the pieces 16a-n is significantly larger than the surface area of the gaps 17. The pieces 16a-n may be adhered or attached to the body of the vehicle 10 via methods known in the art or developed in the future. The adhesive may be an ultraviolet light absorbing adhesive to mitigate harmful damage caused by ultraviolet light.

Figure 3:
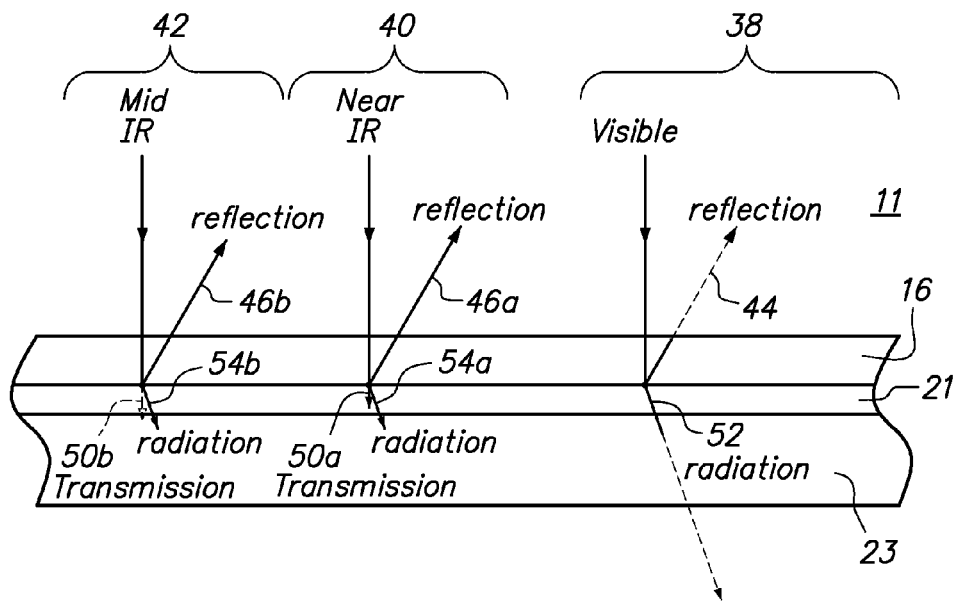
FIG. 3 is an enlarged view of the vehicle's roof and solar control system shown in FIG. 2.
Figure 3A:
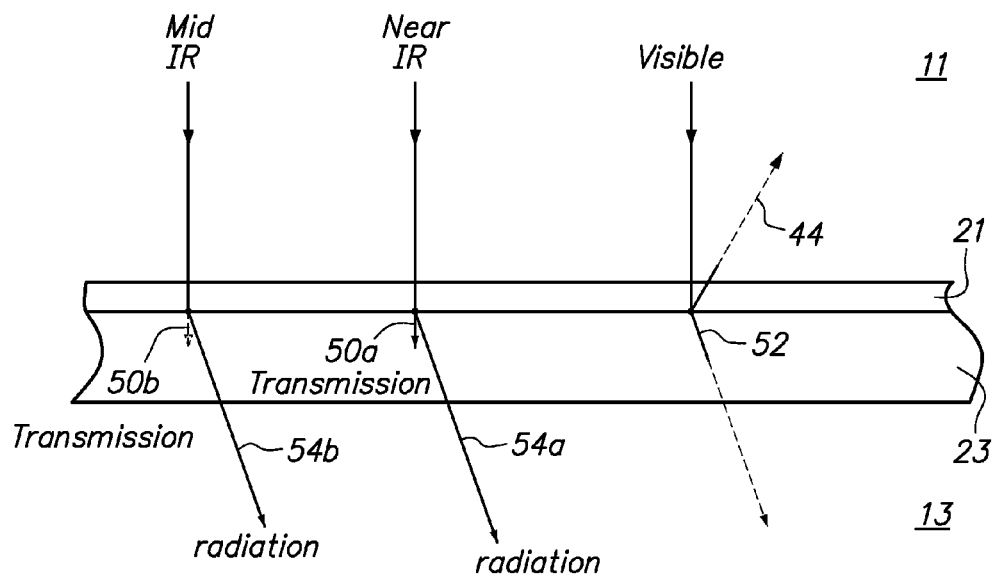
FIG. 3A is an enlarged view of a prior art vehicle roof without the solar control system.

As shown in FIG. 3, solar radiation may be divided into the visible range 38, near infrared range 40, and the mid-infrared range 42. For each of these ranges 38, 40, 42, a portion of the solar radiation is transmitted through the film 16 and a portion of the solar radiation is reflected back to the exterior 11 of the cabin 14 as shown by arrows 44, 46a, b. In the visible range 38, a large percentage (i.e., more than 50%, but preferably about 70% or more) of the light is transmitted through the film 16. Also, depending on the color of the paint layer 21, a certain amount of light in the visible range is absorbed and reradiated 52 into the cabin and a certain amount of light in the visible range is reflected off the paint layer 21 such that the color of the paint layer 21 is visible. This is shown by the combination solid and dash lines 52, 44 in FIGS. 3 and 3A. In contrast, in the near infrared range 40 or the mid infrared range 42, a large percentage (i.e., more than 50% but preferably about 80% or more) of the light is reflected back to the exterior 11 of the cabin 14. Since the film 16 is mounted to the exterior of the paint layer 21, less of the near infrared radiation 40 and the mid infrared radiation 42 reaches the paint layer 21 and the underlying metallic panel 23 compared to the prior art as shown by comparing FIG. 3 with FIG. 3A. FIG. 3A illustrates an untreated automobile body. The lengths of the lines 54a, b and 50a, b which generally indicates magnitude of transmission and radiation is longer in FIG. 3A compared to FIG. 3. As shown, the paint layer 21 and the underlying metallic panel 23 are heated to a lesser extent with use of the film 16 mounted to the exterior of the paint layer 21 such that the solar heat load on the cabin 14 and occupant exposure to re-radiated thermal radiation is reduced. This promotes less or no use of the air conditioning system and/or fan of the automobile 10.

The portion of the solar radiation transmitted through the film 16 is absorbed into the paint layer 21 and the underlying metallic panel 23 thereby heating the paint layer 21 and the underlying metallic panel 23 and re-radiating that energy into the interior 13 of the cabin 14 as shown by arrows 52, 54a, b. Fortunately, as shown in FIG. 3, the amount of re-radiated energy from the paint layer 21 and the underlying metallic panel 23 due to the solar radiation is substantially less with use of the film 16 as shown in FIG. 3 in comparison to FIG. 3A. The film 16 has a high percentage (i.e., more than 50% but preferably about 70% or more) of transmission 48 of the solar radiation in the visible range 38 and a high percentage (i.e., more than 50% but preferably 80% or more) of reflection 46a, b in the near-infrared range 40 and the mid-infrared range 42. The film 16 also reflects a portion of the solar radiation in the far infrared range (not shown in FIG. 2).

Figure 4:
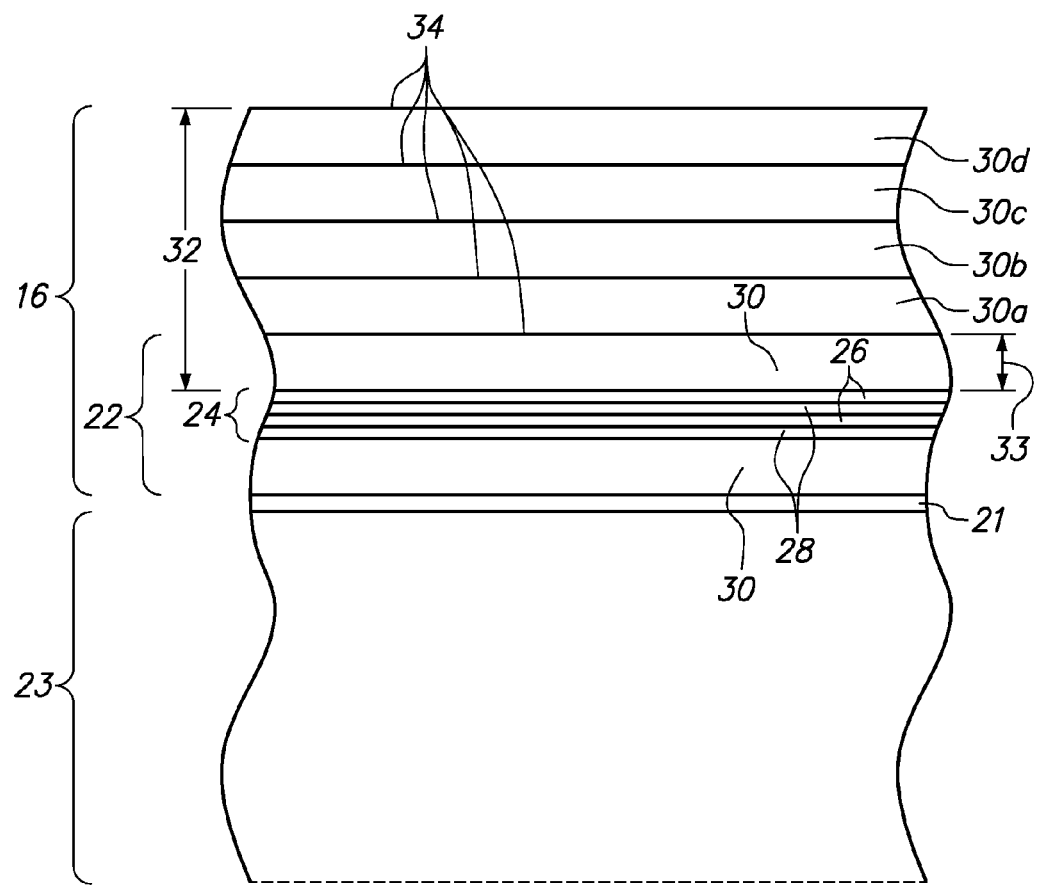
FIG. 4 is an enlarged view of the vehicle roof and solar control system shown in FIG. 3.

Referring now to FIG. 4, an enlarged cross-sectional view of film 16, paint layer 21 and underlying metallic panel 23 is shown. The film 16 may have an infrared reflecting layer 22 with an embedded infrared reflecting core 24. The infrared reflecting core 24 may comprise one or more silver layers 26 and one or more dielectric layers 28. The silver layer 26 and the dielectric layer 28 may alternate such that the infrared reflecting core 24 may comprise a layer of dielectric 28, a layer of silver 26, a layer of dielectric 28, a layer of silver 26, a layer of dielectric 28 all stacked upon each other. Preferably, the dielectric layers 28 are the outermost layers of the embedded infrared reflecting core 24. At a minimum, one silver layer 26 is disposed between two layers of dielectric 28. The silver layers 26 and dielectric layers 28 may have a thickness measured in nanometers. The silver layer 26 may be generally transparent in the visible range and reflect a high percentage of infrared radiation especially in the near infrared range 40 and the mid infrared range 42. The number and thickness of silver layers 26 and the number and thickness of dielectric layers 28 may be adjusted to tune the amount or percentage of infrared radiation being reflected by the infrared reflecting core 24.

The infrared reflecting core 24 may be sandwiched between two layers 30 of material having high transmission (i.e., greater than 50% but preferably about 90% or more) both in the visible range and the near and mid infrared ranges. By way of example and not limitation, the layer 30 may be biaxially-oriented polyethelene terephthalate (hereinafter "BoPET") mylar. BoPET is the preferred material since it is dimensionally stable (i.e., not elastic), has a high transmission in the visible and near and mid infrared ranges, low scatter and low cost. The dimensionally stability of the BoPET layer 30 provides support for the silver layer 26. Otherwise, the silver layer 26 may crack or become damaged upon stretching of the layer 30. Additionally, the infrared reflecting layer 22 is useful for reflecting a high percentage (i.e., more than 50% but preferably about 70% or more) of solar thermal radiation in the near and mid infrared ranges 40, 42 and allowing light in the visible range 38 to be transmitted through the BoPET layers 30 and the infrared reflecting core 24.

One of the characteristics of the silver layer 26 is that upon exposure to oxygen, the silver oxidizes as a black material. In the oxidation process, the silver is converted from a material that reflects heat in the near to mid infrared ranges 40, 42 to a black body that absorbs heat in the near to mid infrared ranges 40, 42. Instead of reflecting a majority of the heat in the near and mid infrared ranges 40, 42, the silver layer 26 now absorbs radiation in both the visible range 38 and the near and mid infrared ranges 40, 42. Detrimentally, the silver layer 26 absorbs and re-radiates such energy into the cabin 14. Additionally, one of the characteristics of the BoPET layer 30 is that oxygen diffuses through the BoPET layer 30 such that oxygen ultimately reaches the silver layer 26 and oxidizes the same 26. To prevent or reduce the rate of oxidation of the silver layers 26 to an acceptable rate, additional layers 30a-d may be stacked on the infrared reflecting layer 22. Any number of layers 30a-n may be stacked on the infrared reflecting layer 22. The amount of oxygen diffused through the layers 30a-n and 30 is a function of a distance 32 from the silver layer 26 and the exterior side 34 of the topmost layer 30. The amount of oxygen reaching the silver layer 26 from an exterior side (i.e., from outside the automobile 10) is reduced since the oxygen must travel a greater distance through the layers 30a-n and 30. On the interior side, the film 16 is mounted to the paint layer 21 and underlying metallic panel 23 which protect the silver layer(s) 26 from oxidation. Oxygen does not pass through the paint layer 21 and the underlying metallic panel 23.

Figure 5:
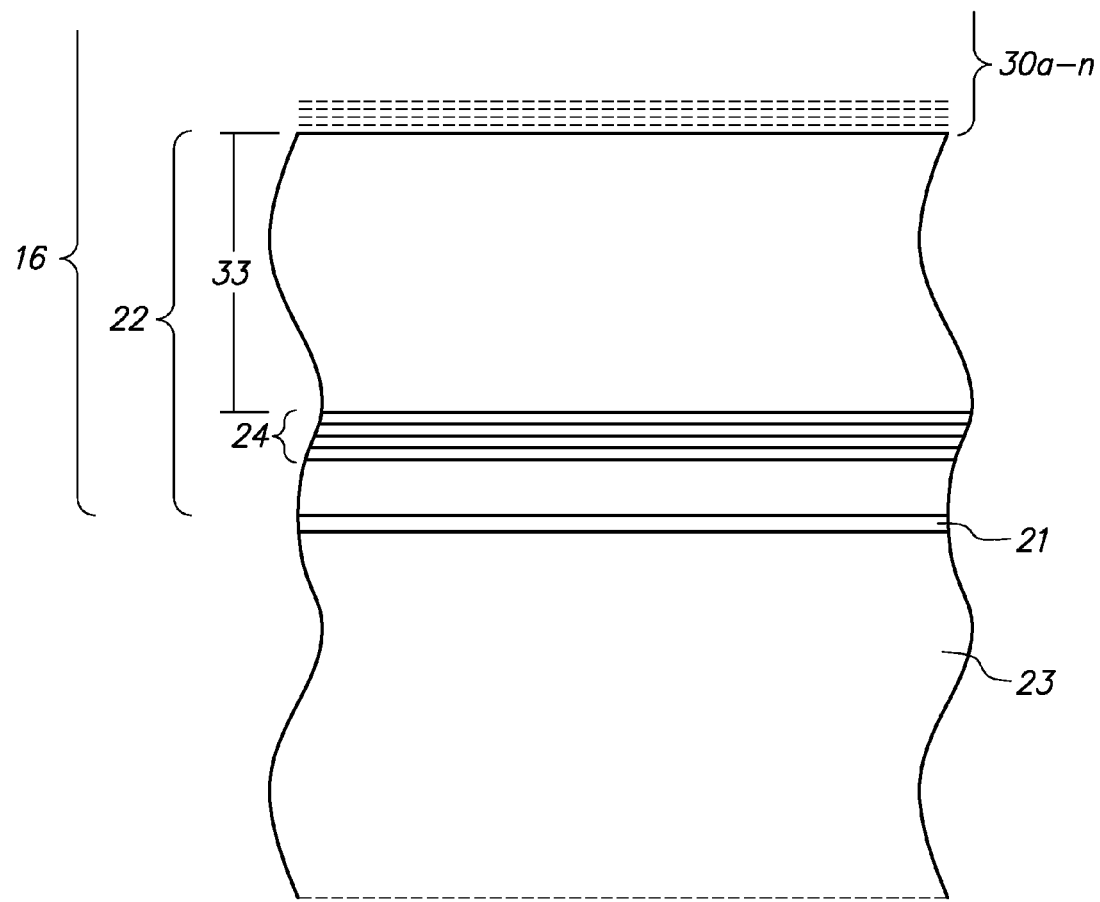
FIG. 5 illustrates an alternate embodiment of the solar control system shown in FIG. 4.

Alternatively, it is contemplated that the thickness 33 of the BoPET layer 30 in the infrared reflecting layer 22 may be increased (see FIG. 5) to slow down the rate of oxidation of the silver layers 26 to an acceptable level. Additionally, an additional stack of BoPET layers 30a-n may be adhered to the BoPET layer 30 on the exterior side, as shown in FIG. 5. The stack of BoPET layers 30a-n may be removably adhered to each other such that the topmost BoPET layer 30a-n may be used as a sacrificial top layer as discussed herein.

Referring back to FIG. 4, during use, the exterior side 34 of the topmost layer 30d is exposed to environmental elements such as rain (containing chemicals), rocks, dirt, ultraviolet light, etc. As such, the exterior side 34 of the topmost layer 30d may experience physical degradation (e.g., chips, oxidation, etc.). It may be difficult to see through the film 16 due to the degradation of the topmost layer 30d over time. Beneficially, each of the layers 30a-d may be removed (e.g., peeled away) from each other and also from the infrared reflecting layer 22. The then topmost layer behaves as a sacrificial layer which is removed when it has been unacceptably degraded by the environmental elements. To this end, the layer 30d may be peelably adhered to layer 30c, layer 30c may be peelably adhered to layer 30d, layer 30d may be peelably adhered to layer 30a and layer 30a may be peelably adhered to the infrared reflecting layer 22. A tab or other means of removing the topmost layer 30d may be provided such that the topmost layer 30d may be peeled off of the adjacent lower layer 30c when the topmost layer 30d is unacceptably degraded. Upon further use, the new top layer 30c experiences physical degradation. When the then topmost layer 30c is degraded to an unacceptable level, the topmost layer 30c is now peeled away from the top layer 30b. The process is repeated for layers 30b and 30a. As the topmost layers 30d, c, b, a are peeled away, the rate of oxidation of the silver layer 26 increases. As such, the number of layers 30a-n may be increased or decreased based on the required useful life of the film 16. To extend the useful life of the film 16, additional layers 30a-n are stacked upon each other to increase the distance 32. Conversely, to decrease the useful life of the film 16, fewer layers 30a-n are stacked upon each other to decrease the distance 32. When the silver layer 26 is unacceptably oxidized, the entire film 16 is removed from the glass 20 and a new film 16 is mounted to the exterior surface 36 of the glass 20.

Each of the BoPET layers 30a-d and 30 may define an exterior side 34. An ultraviolet light absorbing hard coat may be coated onto the exterior side 34 of the BoPET layers 30a-d and 30 to slow the damaging effects of ultraviolet light on the BoPET layer 30. Additionally, the adhesive for attaching the BoPET layers 30a-d to each other as well as the adhesive for adhering the BoPET layer 30a to the infrared reflecting layer 22 may be an ultraviolet light absorbing adhesive to further slow the damage of ultraviolet light exposure. Such adhesives may continuously cover most, if not all, of the BoPET layers 30a-d and the infrared reflecting layer 22.

A method for attaching the film 16 to the body of the vehicle 10 will now be described. Initially, the film 16 is provided. The film 16 may have a peelable protective layer on both sides to protect the silver layers 26 from oxidation and the exterior surfaces from oxidation as well as chipping prior to installation and during storage. The protective layer may be impermeable to oxygen to prevent oxidation of the exterior surfaces of the film 16 as well as oxidation of the silver layers 26. The protective layer may also block ultraviolet light to mitigate damage to the film 16 in the event the film 16 is left out in the sun. The protective layer may be adhered to the exterior surfaces of the film 16 in a peelable fashion. Prior to mounting the film 16 to the glass 20, the film 16 may be cut to the size based on the size, shape and contour of the body of the vehicle 10 to be protected. After the film 16 is cut to size, the protective layers may be peeled away to expose the film 16. The exposed side of the infrared reflecting layer 22 may have a pressure sensitive adhesive that may be activated by water or other fluid. The pressure sensitive adhesive may continuously cover most, if not all, of the opposed side of the infrared reflecting layer 22. The exterior side of the paint layer 21 may be wetted down with water or the other fluid. The cut film 16 may now be laid over the exterior side of the paint layer 21. Any air bubbles may be squeegeed out. The moist adhesive on the infrared reflecting layer 22 is allowed to dry such that the film 16 is mounted to the paint layer and the film 16 cannot slip with respect to the body of the vehicle 10.

The film 16 may be fabricated in the following manner. Initially, a BoPET layer 30 is provided as a roll. The BoPET layer 30 is unrolled and a layer of dielectric 28 is formed on one side of the BoPET layer 30. The thickness of the BoPET layer 30 may be approximately two thousandths of an inch thick. The thickness of the dielectric layer 28 may be measured in nanometers. As the layer of dielectric 28 is laid on one side of the BoPET layer 30, the BoPET layer 30 is rerolled. The BoPET layer 30 is then unrolled such that a layer of silver 26 may then be laid on top of the layer of dielectric 28. The silver layer 26 is also measured in nanometers and is extremely thin. The BoPET layer 30 is rolled back up and unrolled a number of times until the desired number of silver and dielectric layers 26, 28 is attained. A second BoPET layer 30 (about 0.002 inches thick) may be laminated onto the dielectric layer 28 such that two BoPET layers 30 sandwich the alternating layers of silver 26 and dielectric 28 which form the infrared reflecting core 24. Thereafter, additional layers of BoPET 30a-n (each layer being about 0.002 inches thick) may be laminated onto the infrared reflecting layer 22 to serve as a sacrificial layer and reduce the rate of oxygen diffusion. Optionally, protective layers for protecting the film 16 during storage and prior to installation may be laminated onto opposed sides of the film 16. The thickness of the film 16 may be limited by the amount of bending required to roll the film 16 during manufacture. For thicker films 16, it is contemplated that the film 16 may be fabricated in a sheet form process.

The above description is given by way of example, and not limitation. Given the above disclosure, one skilled in the art could devise variations that are within the scope and spirit of the invention disclosed herein, including various ways of adhering the film 16 to the glass 20. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method for reducing solar radiation load within an automobile, the method comprising the steps of:
    providing a film for reflecting infrared radiation, the film comprising:
        an infrared reflecting layer having an interior side and an exterior side, the infrared reflecting layer having an embedded infrared reflecting core which comprises one or more layers of silver and one or more layers of dielectric for reflecting infrared radiation; and
        one or more protective layers removeably attached to the exterior side of the infrared reflecting layer for mitigating oxidation of the silver layer and for providing a sacrificial top layer which can be removed when the top layer is damaged due to UV exposure or oxidation; and
    attaching an interior side of the infrared reflecting layer to an exterior side of the automobile.

2. The method of claim 1 wherein the attaching step comprises the step of adhering the interior side of the infrared reflecting layer to the exterior side of the automobile.

3. The method of claim 2 wherein the exterior side of the automobile is at least one of a roof, hood, and trunk.

4. The method of claim 1 further comprising the step of providing a stack of sacrificial layers removeably attached to each other such that a top most sacrificial layer may be removed and discarded when the top most protective layer is damaged due to ultraviolet exposure and/or oxidation.

5. The method of claim 1 wherein the providing a film step comprises the step of providing a plurality of film pieces, and the attaching step comprises the step of butting up film pieces against each other edge to edge.

* * * * *